(12) United States Patent
Masuda

(10) Patent No.: US 7,609,201 B2
(45) Date of Patent: Oct. 27, 2009

(54) POSITION-VERIFIED ACCESS APPARATUS, METHOD, AND PROGRAM PRODUCT

(75) Inventor: Kazuo Masuda, Kanagawa-ken (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 347 days.

(21) Appl. No.: 10/908,968

(22) Filed: Jun. 2, 2005

(65) Prior Publication Data
US 2005/0270232 A1 Dec. 8, 2005

(30) Foreign Application Priority Data
Jun. 2, 2004 (JP) .............................. 2004-165088

(51) Int. Cl.
*G01S 1/00* (2006.01)
*H04M 1/66* (2006.01)
(52) U.S. Cl. .................................. 342/357.02; 455/410
(58) Field of Classification Search ................ 342/357, 342/357.02; 455/410
See application file for complete search history.

(56) References Cited

U.S. PATENT DOCUMENTS

| | | | | |
|---|---|---|---|---|
| 6,108,365 | A * | 8/2000 | Rubin et al. ................. | 375/130 |
| 6,861,979 | B1 * | 3/2005 | Zhodzishsky et al. .. | 342/357.03 |
| 7,149,533 | B2 * | 12/2006 | Laird et al. ............... | 455/456.3 |
| 2003/0022656 | A1 * | 1/2003 | Hinnant et al. ............. | 455/410 |
| 2003/0181160 | A1 * | 9/2003 | Hirsch ........................ | 455/3.02 |
| 2003/0217122 | A1 * | 11/2003 | Roese et al. ................ | 709/219 |
| 2003/0217137 | A1 * | 11/2003 | Roese et al. ................ | 709/223 |
| 2003/0225893 | A1 * | 12/2003 | Roese et al. ................ | 709/227 |
| 2004/0044911 | A1 * | 3/2004 | Takada et al. ............... | 713/201 |
| 2004/0266457 | A1 * | 12/2004 | Dupray ..................... | 455/456.5 |
| 2005/0040944 | A1 * | 2/2005 | Contestabile ........... | 340/539.13 |
| 2005/0085257 | A1 * | 4/2005 | Laird et al. ............... | 455/550.1 |
| 2005/0134440 | A1 * | 6/2005 | Breed ......................... | 340/435 |
| 2005/0148344 | A1 * | 7/2005 | Fan et al. .................. | 455/456.3 |

FOREIGN PATENT DOCUMENTS

| | | |
|---|---|---|
| JP | 10-267656 | 10/1998 |
| JP | 11-512860 | 11/1999 |
| JP | 2002-117377 | 4/2002 |
| JP | 2002-183188 | 6/2002 |
| JP | 2004-085239 | 3/2004 |

* cited by examiner

*Primary Examiner*—Thomas H Tarcza
*Assistant Examiner*—Harry Liu
(74) *Attorney, Agent, or Firm*—Michael J. Corrigan; Driggs, Hogg, Daugherty & Del Zoppo Co., LPA

(57) ABSTRACT

An acquisition apparatus for acquiring the positional information indicating the position of a position detecting device which, in one embodiment, detects position based on a GPS (Global Positioning System). The position detecting device measures the device distance to each of a plurality of satellites and calculates the device position based on the device distance and the position of each of the plurality of satellites. The acquisition apparatus comprises a receiving part for receiving the device distance and the device position from the position detecting device, and a verification position calculating part for calculating the verification position that is the position to be calculated by the position detecting device, based on the received device distance and the position of each of the plurality of satellites at the time of measuring the device distance. The apparatus further includes a validity judgment part for judging that the device position detected by the position detecting device is valid, on condition that the device position is coincident with the verification position.

10 Claims, 4 Drawing Sheets

POSITION-VERIFIED ACCESS APPARATUS, METHOD, AND PROGRAM PRODUCT

BACKGROUND

The present invention relates to an acquisition apparatus, an access control unit, an acquisition method, an access control method, a program and a recording medium. More particularly, the present invention relates to an acquisition apparatus, an access control unit, an acquisition method, an access control method, a program and a recording medium using GPS positional information.

Recently, GPS (Global Positioning System) has been used for detecting a global position of a receiver based on signals received from satellites by the receiver. The receiver of GPS measures the distances between the receiver and satellites based on traveling time of the signals received from the satellites. However, the distances measured by the receiver contain various errors. Therefore, it has been difficult to precisely calculate the position of the receiver.

To address this, conventionally, a technology has been proposed for correcting the position detected by GPS, thereby leading to more accurate position (see Patent Documents 1 and 2).

[Patent Document 1] Published Unexamined Patent Application No. 06-3431

[Patent Document 2] Published Unexamined Patent Application No. 2002-107442

SUMMARY

Recently, wireless LAN (Local Area Network) technology has been used for wirelessly connecting to LAN in a company or a home. Wireless LAN is convenient in that user can access LAN without having to connect a cable to an information processing device. On the other hand, radio wave from LAN access points can leak outside a building of a company, etc. Therefore, illegal or improper third party LAN access that is not permitted is considered to be problematic.

Conventionally, in order to prevent the illegal access described above, a technology for encrypting communications, or a technology for permitting access under condition of inputting identification information has been used. However, in either case, once cryptographic key or the like is obtained, it is possible to connect to LAN in the company from the outside of the company. Therefore, before permitting a device to access, it is necessary to confirm that the device accessing LAN is provided within the building of the company.

With the above GPS, the GPS receiver can detect the position of the receiver almost correctly. However, if the GPS receiver is remodeled, it is relatively easy to counterfeit the positional information as if the receiver were placed within a company. With the techniques as disclosed in Patent Document 1 and Patent Document 2, it is not possible to detect whether or not the GPS receiver counterfeits the positional information, because of their different purposes. In contrast, it is a purpose of the present invention to determine appropriately the validity of the positional information calculated by the GPS receiver.

Accordingly, it is a purpose of the present invention to provide an acquisition apparatus, an access control unit, an acquisition method, an access control method, a program and a recording medium which can solve the purpose describe above. This purpose is achieved by features described in independent claims. Further preferred embodiments of the present invention are laid down in dependent claims.

To solve above stated purpose, in a first aspect of the present invention, an acquisition apparatus, an access control method including the acquisition apparatus, an acquisition method, an access control method, a program and a recording medium for acquiring the positional information indicating the position of a position detecting device from the position detecting device for detecting the position based on a GPS (Global Positioning System) are provided, wherein the position detecting device measures the device distance from the position detecting device to each of a plurality of satellites and calculates the device position that is the position of the position detecting device based on the device distance and the position of each of the plurality of satellites, the acquisition apparatus comprises: an receiving part for receiving the device distance and the device position from the position detecting device; a verification position calculating part for calculating the verification position that is the position to be calculated by the position detecting device, based on the received device distance and the position of each of the plurality of satellites at the time of measuring the device distance; and a validity judgment part for judging that the device position detected by the position detecting device is valid, on condition that the device position is coincident with the verification positions.

The summary of the present invention described above does not recite all of the required features of the present invention. The sub-combination of these features group can also constitute an invention.

Accordingly, validity of a position detected by using GPS can be determined.

BRIEF DESCRIPTION of the DRAWINGS

Some of the purposes of the invention having been stated, others will appear as the description proceeds, when taken in connection with the accompanying drawings, in which.

DETAILED DESCRIPTION OF THE ILLUSTRATIVE EMBODIMENTS

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of this invention. Accordingly, the description which follows is to be understood as being a broad, teaching disclosure directed to persons of skill in the appropriate arts, and not as limiting upon the present invention. All combinations of features described in the embodiments are not necessarily required for the solution of the invention.

Figure 1:
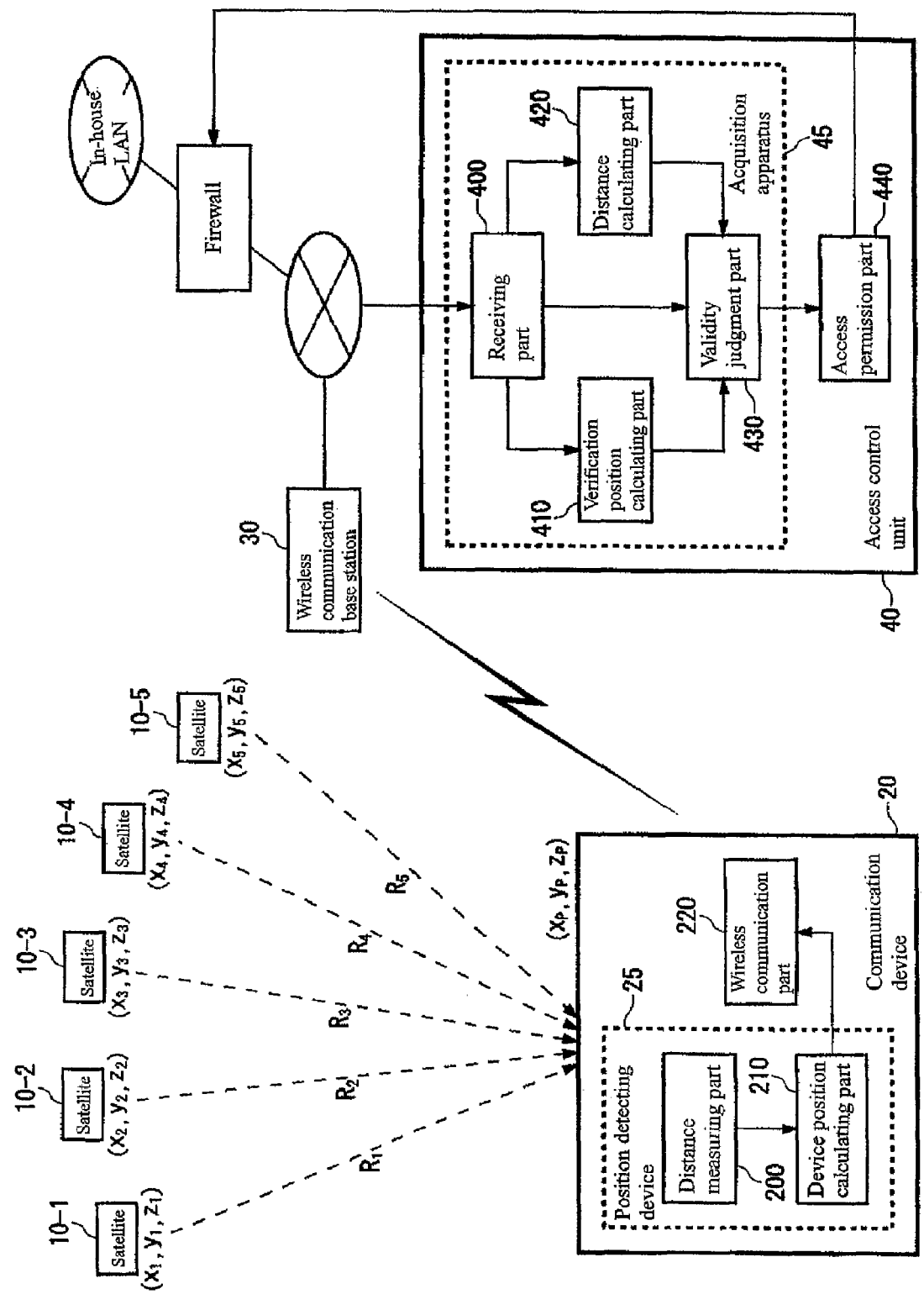
FIG. 1 shows a functional block diagram of a communication device 20 and an access control unit 40.

Referring now more particularly to the accompanying drawings, in which like numerals indicate like elements or steps throughout the several views, FIG. 1 is a functional block diagram of a communication device 20 and an access control unit 40. When the access control unit 40 acquires from the communication device 20 a positional information indicating the position of the communication device 20, the access control unit 40 permits the communication device 20 to access an in-house LAN, provided that the acquired positional information is valid and the position indicated by the positional information is within a predetermined region. In this way, it is aimed to effectively prevent illegal access to the in-house LAN.

The communication device 20 comprises a position detecting device 25 and a wireless communication circuit or part 220. The position detecting device 25 has a distance measuring part 200 and a device position calculating part 210. The distance measuring part 200 measures the device distance from the communication device 20 to each of a plurality of satellites. For example, distance measuring part 200 measures the device distance from the communication device 20 to each of five or more satellites, based on the time elapsed since each of the five or more satellites transmitted a signal until the communication device 20 receives the signal.

The distance measuring part 200 can measure the device distances to all satellites from which communication device 20 can receive a signal. For example, the distance measuring part 200 can measure the device distances to up to 12 satellites. In this embodiment, for the purpose of explanation, the distance measuring part 200 measures the device distance from the communication device 20 to each of satellites 10-1 to 5. And let R1, R2, R3, R4 and R5 be the measured device distances from the communication device 20 to each of satellites 10-1 to 5 respectively.

The device position calculating part 210 calculates a device position that is the position of communication device 20, based on these device distances measured by the distance measuring part 200 and the position of each of satellites 10-1 to 5. Let $(x_p, y_p, z_p)$ be the vector indicating coordinates of the calculated device position. Here, the device position calculating part 210 can calculate positions of the satellites 10-1 to 5 at the time of measuring the device distances based on a predetermined equation or the like indicating the satellite orbit, or the device position calculating part 210 can acquire them from another server device or the like managing the satellite orbit. Let $(x_1, y_1, z_1)$, $(x_2, y_2, z_2)$, $(x_3, y_3, z_3)$, $(x_4, y_4, z_4)$, etc., be the coordinates of positions of satellites 10-1 to 5 respectively.

The wireless communication part 220 wirelessly communicates with the access control unit 40 over at least one wireless communication base station. For example, the wireless communication part 220 transmits the identification of each satellite, the device distance to each satellite, the time of measuring the device distances, the device position and the identification information indicating device type of the communication device 20, over the wireless communication base station 30 to the access unit 40.

The access control unit 40 comprises an acquisition apparatus 45 and an access permission part 440. The acquisition apparatus 45 has a receiving part 400, a verification position calculating part 410, a distance calculating part 420 and a validity judgment part 430. The receiving part 400 acquires from the communication device 20 the identifications of each satellite, the device distances measured by measuring part 200, and the device position calculated by the device position calculating part 210. Furthermore, the receiving part 400 acquires from the communication device 20 the time of measuring the device distances and the device type identification information.

The verification position calculating part 410 calculates the verification position to be detected by the communication device 20, based on the received device distances and the position of each of satellites 10-1 to 5 at the time of measuring the device distances. A calculation method is described in detail below, but for example, the verification position calculating part 410 can calculate the verification position by a predetermined calculating method corresponding to the device type identification information. Furthermore, as another verification position, the verification position calculating part 410 can also calculate the verification position to be detected by the communication device 20, based on the position of the wireless communication base station 30 over which the communication device 20 wirelessly communicated with the acquisition apparatus 45.

The distance calculating part 420 calculates the distance between each of satellites 10-1 to 5 at the time of measuring the device distance by the distance measuring part 200 and the device position received by the receiving part 400. If the device position is coincident with the verification position, the validity judgment part 430 judges that the device position detected by the communication device 20 is valid. In addition, the validity judgment part 430 can also judge that the device position detected by the communication device 20 is valid, further provided that the distance between the device position and the other verification position is within a predetermined reference distance.

In addition, the validity judgment part 430 can also judge that the device position detected by the communication device 20 is valid, further provided that the device distance received by the receiving part 400 differs from the distance calculated by the distance calculating part 420 by a predetermined difference value or more, for example, where the predetermined difference value is the distance on the order of 1.5 m to 4 m. This allows prohibiting access if the error is extremely small and unnatural and thus it is likely to be illegal access.

In addition, validity judgment part 430 can also judges that the device position detected by the communication device 20 is valid, further provided that the time elapsed since the distance measuring part 200 measured the device distance until the receiving part 400 receives the measured device distance and the device position is less than a predetermined reference period. This may limit the time for calculating the device position, thus it becomes difficult to counterfeit the device position.

If it is determined that the device position of the communication device 20 is valid and the device position is within a predetermined access permission region, the access permission part 440 permits for the communication device 20 to access to the in-house LAN. For example, the access permission part 440 can direct a firewall to permit the access.

Figure 2:
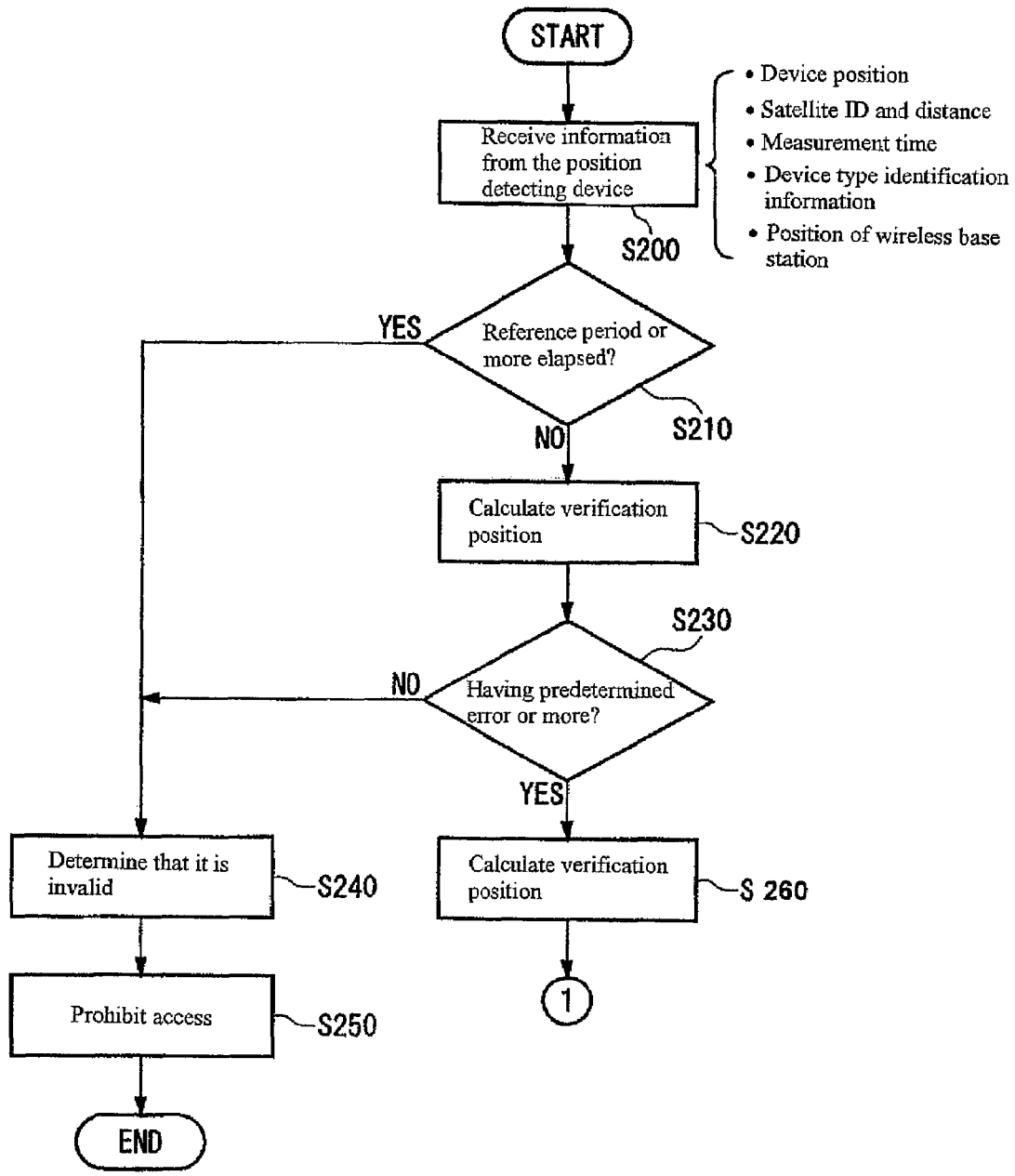
FIG. 2 shows a workflow of a process for determining whether or not an acquisition apparatus 45 judges that the device information of the communication device 20 is valid.

FIG. 2 shows a workflow of a process for determining whether or not the acquisition apparatus 45 judges that the device information of the communication device 20 is valid. The receiving part 400 receives from the communication device 20, the identification of each satellite, the device distances measured by the distance measuring part 200 and the device position calculated by the device position calculating part 210 (S200). The receiving part 400 also receives the time of measuring the device distances and the device type identification information from the communication device 20. Further, receiving part 400 can also receive the position of the wireless base station 30 over which the information are received from the communication device 20.

The validity judgment part 430 determines whether or not a predetermined reference period or more elapsed since the distance measuring part 200 measured the device distance until the receiving part 400 receives the measured device distance and the device position (S210). If the predetermined reference period or more elapsed (S210:YES), the validity judgment part 430 determines that the device position detected by the communication device 20 is invalid (S240). Then the access permission part 440 prohibits the communication device 20 from accessing to the in-house LAN (S250).

Otherwise, if the time elapsed is less than the predetermined reference period (S210:NO), the distance calculating part 420 calculates the verification distance that is the distance between the position of each of satellites 10-1 to 5 at the time of measuring the device distance by the distance measuring part 200 and the device position received by the receiving part 400. More particularly, the distance calculating part 420 accumulates observation data of the satellite positions observed by a fixed station at places on earth for a past predetermined period. The fixed station refers to, for example, medium wave radiophare (radio beacon or the like) of Japan Coat Guard. Then the distance calculating part 420 calculates the coordinates of position of each satellite at the measurement time when the distances from the communication device 20 to the satellites are measured, based on the observation data and the measurement time. The distance calculating part 420 calculates as the verification distance, the distances between the coordinates of the position of each satellite and the coordinates of the received device position.

Then the validity judgment part 430 determines whether or not the device distances received by the receiving part 400 between the communication device 20 and each satellite has a predetermined error or more (S230). That is, for example, the validity judgment part 430 determines whether or not the device distances received by the receiving part 400 differ from the verification distances calculated by the distance calculating part 420 by a predetermined difference value or more.

If the device distances received by the receiving part 400 have not the predetermined error (S230:NO), the validity judgment part 430 determines that the device position detected by the communication device 20 is invalid (S240). Then the access permission part 440 prohibits the communication device 20 from accessing to the in-house LAN (S250). Otherwise, if the device distances received by the receiving part 400 have the predetermined error or more (S230:YES), the verification position calculating part 410 calculates the verification position to be detected by the communication device 20, based on the received device distances and the position of each of satellites 10-1 to 5 at the time of measuring the device distances (S260).

A calculation method varies depending on the device type identification information. An example of calculation methods is described here. The relation among the device distance from the communication device 20 to each of the satellites, the position of each satellite and the distance between each satellites and the device position is represented by the following equation (1).

$$\sqrt{(x_i-x_p)^2+(y_i-y_p)^2+(z_i-z_p)^2}=R_i+c\Delta t \quad \text{Equation (1):}$$

Where $(x_i, y_i, z_i)$ is the position of the satellite whose identification is i. $R_i$ is the device distance from the communication device 20 to the satellite, received by the receiving part 400. Assume that the velocity of the signal transmitted from the satellite to the communication device 20 is equal to the light velocity c. $\Delta t$ is the error of clock used by the communication device for measuring the device distance to the satellite. $(x_p, y_p, z_p)$ is the vector indicating the coordinates of the device position as the verification position, and each element of this vector is unknown.

Therefore, this equation is the equation whose unknowns are the clock error of the distance measuring part 200 and each element of the vector indicating the coordinates of the device position. The left side of the equation represents the distance calculated based on the each position of certain satellites and the device position. The right side of the equation represents the device distance to the satellite measured by the distance measuring part 200, plus the clock error of the distance measuring part 200 multiplied by the signal velocity.

Linear approximation of equation (1) is represented by equation (2).

$$x_p = x_0 + \Delta x$$
$$y_p = y_0 + \Delta y$$
$$z_p = z_0 + \Delta z$$
$$\Delta R_i = \frac{\partial R}{\partial x}\Delta x + \frac{\partial R}{\partial y}\Delta y + \frac{\partial R}{\partial z}\Delta z + \Delta S$$
$$\frac{\partial R_i}{\partial x} = -\frac{(x_i - x_0)}{R_i} = \alpha_i$$
$$\frac{\partial R_i}{\partial y} = -\frac{(y_i - y_0)}{R_i} = \beta_i$$
$$\frac{\partial R_i}{\partial z} = -\frac{(z_i - z_0)}{R_i} = \gamma_i$$

Equation (2)

Rewriting equation (2) in matrix form yields equation (3).

$$\begin{pmatrix} \Delta R_1 \\ \Delta R_2 \\ \Delta R_3 \\ \bullet \\ \Delta R_n \end{pmatrix} = \begin{pmatrix} \alpha_1 & \beta_1 & \gamma_1 & 1 \\ \alpha_2 & \beta_2 & \gamma_2 & 1 \\ \alpha_3 & \beta_3 & \gamma_3 & 1 \\ \bullet & \bullet & \bullet & 1 \\ \alpha_n & \beta_n & \gamma_n & 1 \end{pmatrix} \begin{pmatrix} \Delta x \\ \Delta y \\ \Delta z \\ \Delta S \end{pmatrix}$$

Equation (3)

Where $\Delta S$ is $c\Delta t$. n is the number of satellites, such as five. These equations are equations whose unknowns are $\Delta x$, $\Delta y$, $\Delta z$ and $\Delta S$. That is, the number of equations is greater than the number of unknowns. Therefore, these equations have not unique solution. For that reason, the verification position calculating part 410 determines the optimum solution by, for example, the least squares method. For example, by solving equation (4), the verification position calculating part 410 obtains the solution of the least squares method.

$$A = \begin{pmatrix} \alpha_1 & \beta_1 & \gamma_1 & 1 \\ \alpha_2 & \beta_2 & \gamma_2 & 1 \\ \alpha_3 & \beta_3 & \gamma_3 & 1 \\ \bullet & \bullet & \bullet & 1 \\ \alpha_n & \beta_n & \gamma_n & 1 \end{pmatrix}^T \cdot \begin{pmatrix} \alpha_1 & \beta_1 & \gamma_1 & 1 \\ \alpha_2 & \beta_2 & \gamma_2 & 1 \\ \alpha_3 & \beta_3 & \gamma_3 & 1 \\ \bullet & \bullet & \bullet & 1 \\ \alpha_n & \beta_n & \gamma_n & 1 \end{pmatrix}$$

$$A\begin{pmatrix} \Delta x \\ \Delta y \\ \Delta z \\ \Delta S \end{pmatrix} = 0$$

Equation (4)

In this way, the verification position calculating part 410 makes equations representing that for each of five or more satellites, the device distance to the satellite measured by the distance measuring part 200, plus the clock error of the distance measuring part 200 multiplied by the signal velocity is equal to the distance calculated based on the position of the satellite and the device position. Then the verification position calculating part 410 calculates the verification position by solving these equations by the least squares method.

The description of the calculation method for the device position calculating part 210 to calculate the device position is omitted because such method is similar to the calculation method for the verification position calculating part 410 to calculate the verification position.

Figure 3:
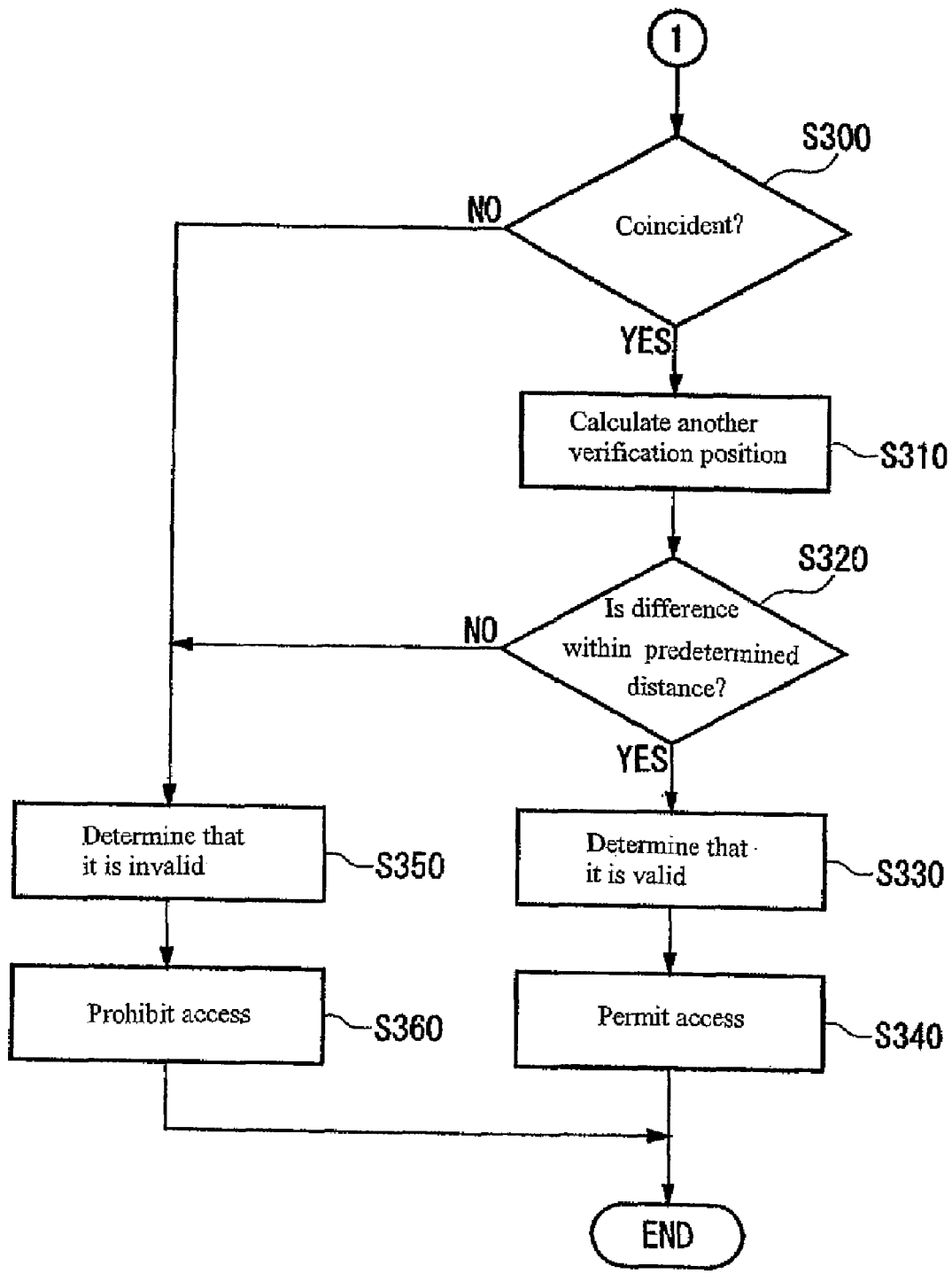
FIG. 3 shows a workflow of a process subsequent to FIG. 2.

FIG. 3 shows a workflow of a process subsequent to FIG. 2. The validity judgment part 430 determines whether or not the device position received by the receiving part 400 is coincident with the verification position calculated by the verification position calculating part 410 (S300). If not (S300: NO), the validity judgment part 430 determines that the device position detected by the communication device 20 is invalid (S350). Then the access permission part 440 prohibits the communication device 20 from accessing to the in-house LAN (S360).

In this way, the validity judgment part 430 determines the validity of the device position by determining that the device position is coincident with the verification position calculated by the same method as that of calculating the device position. Here, because the device position is the optimum solution calculated by the least squares method or the like based on the distance to each satellite, it is difficult to inversely calculate the device distance from the position detecting device to each of satellites based on the device position. Therefore, the validity judgment part 430 can determine that the position detecting device 25 measured the device distance to each satellite at its device position if the device position is coincident with the verification position.

Otherwise, if the device position is coincident with the verification position (S300: YES), the verification position calculating part 410 calculates as another verification position the position to be detected by the communication device 20, based on the position of the wireless base station 30 over which the communication device 20 wirelessly communicated with the acquisition apparatus 45 (S310). For example, the verification position calculating part 410 calculates the other verification position based on the propagation range between the wireless base station 30 and the communication device 20. More particularly, if the wireless base station 30 is a wireless LAN access point complying with the IEEE 802.11b standard or a transceiver for Bluetooth, due to its short propagation range, the verification position calculating part 410 can calculate the other verification point as the position of the wireless base station 30 itself.

In another example, if the communication device 20 communicates with the plurality of wireless base stations, the verification point calculating part 410 can also calculate as the other verification point the position that is within the propagation range of any wireless base station. In addition, instead of the propagation range, the verification position calculating part 410 can calculate the other verification point using the estimated distance based on the radio intensity between the wireless base station 30 and the communication device 20.

If the distance between the device position and the other verification position is within a predetermined reference distance (S320: YES), the validity judgment part 430 determines that the device position detected by the communication device 20 is valid (S330). Then the access permission part 440 permits for the communication device 20 to access to the in-house LAN (S340), provided that the device position is within a predetermined region (S340).

Otherwise, if the distance between the device position and the other verification position is greater than the reference distance (S320: NO), the validity judgment part 430 determines that the device position detected by the communication device 20 is invalid (S350). Then the access permission part 440 prohibits the communication device 20 from accessing to the in-house LAN (S360). As described above, the validity judgment part 430 determines quickly and appropriately that the calculated device position is valid. This effectively allows for the prevention of illegal access to an in-house LAN or the like.

As a example of a method for counterfeiting the device position, a method is envisaged that calculates the distances from a neighborhood of the desired device position to be counterfeited to each satellite, then calculates the device position based on the distances by the least squares method. According to this method, it is conceivable that although the position that is completely coincident with the desired position to be counterfeited can not be counterfeited, the positional information close to the desired device position to be counterfeited can be counterfeited to some extent. The Rayleigh distribution was used to verify approximately an error in which the device position can be counterfeited.

Using the Rayleigh distribution, the probability distribution can be determined which represents a shift from the center of a target when shooting at the target. For example, assume that the error distributions in the directions of x and y axes are $\sigma^2$, then the average distance from the center is $\sigma\sqrt{\Pi/2}$, and its variance is $2\sigma^2$. Assume that the error in north-south direction is 10 m, then the average distance from the target point is 12.5 m, and the standard deviation is 14.1 m. Applying this to the four-dimensional distribution of GPS (longitude, latitude, altitude and clock time), for a hypersphere with a determined four-dimensional radius R, the average radius is 1.57R, the probability of being within the hypersphere is 1/6.07=16.5%.

As estimated from the above verification, it is difficult to counterfeit the distance to the satellite trying to counterfeit the device position. That is, in the access control unit 40 according to this embodiment, by comparing the verification position with the device position, the validity of the device position can be properly determined.

Figure 4:
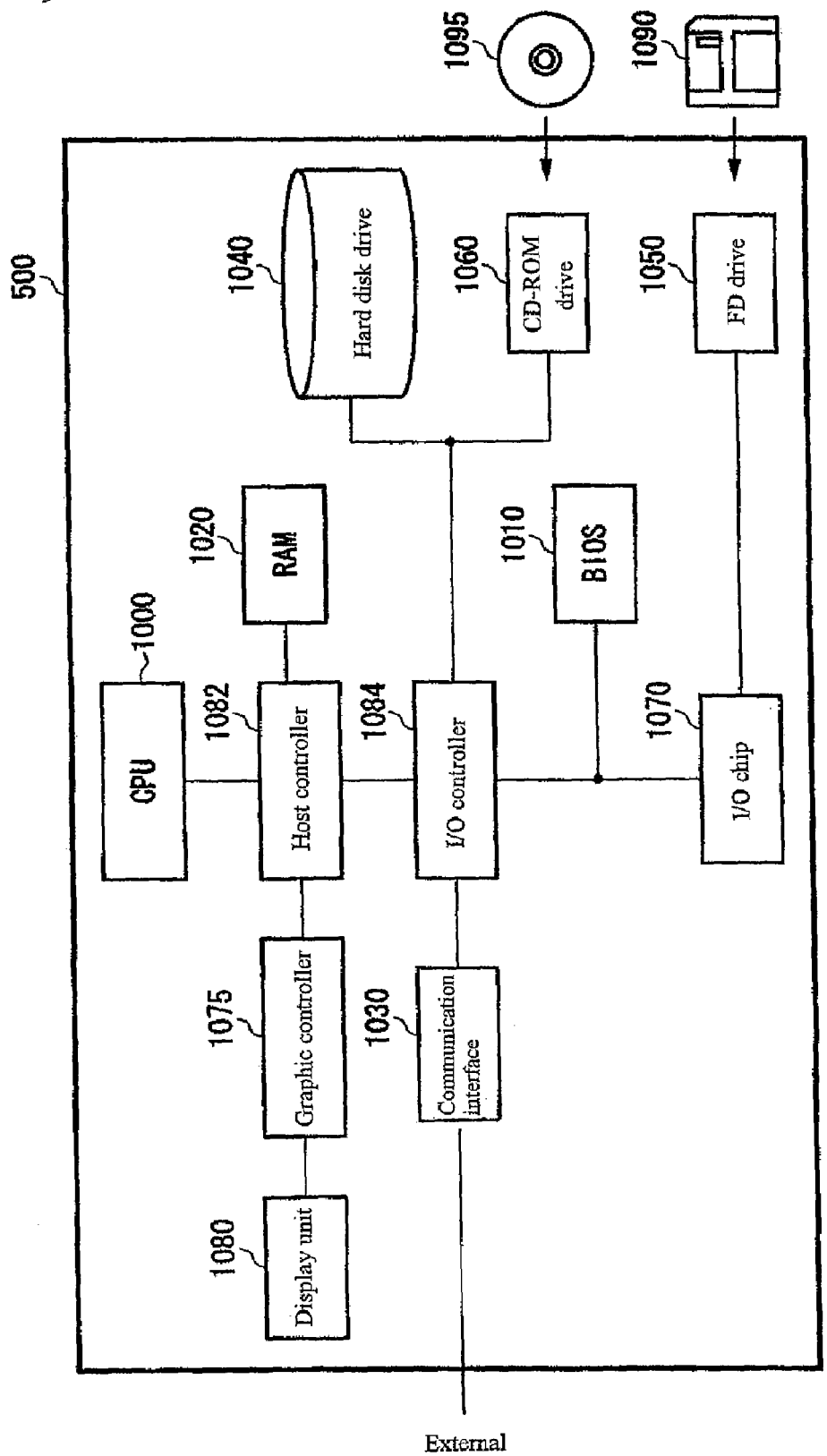
FIG. 4 shows an example of a hardware configuration of a computer 500 which functions as an access control unit 40.

FIG. 4 shows an example of a hardware configuration of a computer 500 which functions as the access control unit 40. The computer 500 comprises CPU peripherals having a CPU 1000, RAM 1020 and a graphic controller 1075 which are interconnected by a host controller 1082, an input/output (I/O) part having a communication interface 1030, a hard disk drive 1040 and CD-ROM drive 1060 which are connected to the host controller 1082 by an I/O controller 1084, and a legacy I/O part having a BIOS 1010, a flexible disk drive 1050 and I/O chip 1070 which are connected to the I/O controller 1084.

The host controller 1082 connects the RAM 1020 with the CPU 1000 and the graphic controller 1075 that access to the RAM 1020 in a high transfer rate. The CPU 1000 operates based on the program stored in the BIOS 1010 and RAM 1020, and controls each part. The graphic controller 1075 acquires the image data generated on a frame buffer which is provided in the RAM 1020 by the CPU 1000 or the like, then displays the image data on a display unit 1080. Alternatively, the graphic controller 1075 can include the frame buffer storing the image data generated by the CPU 1000 or the like.

The I/O controller 1084 connects the host controller 1082 with the communication interface 1030, hard disk drive 1040 and CD-ROM drive 1060 which are relatively fast I/O devices. The communication interface 1030 communicates with an external device over network. The hard disk drive 1040 stores the program and data used by the computer 500. CD-ROM drive 1060 reads the program or data from the CD-ROM 1095, and provides it to the I/O chip 1070 through the RAM 1020.

The BIOS 1010, and relatively slow I/O devices such as the flexible disk drive 1050 and I/O chip 1070 are connected to the I/O controller 1084. The BIOS 1010 stores the boot program that the CPU 1000 executes during start-up of the computer 500, the program depending on the hardware of the computer 500 and the like. The flexible disk drive 1050 reads a program or data from a flexible disk 1090, and provides it to the I/O chip 1070 through RAM 1020. The I/O chip 1070 connects to the flexible disk 1090, and various I/O devices through, for example, a parallel port, a serial port, a keyboard port, a mouse port and the like.

The program provided to the computer 500 is stored in a recording medium such as the flexible disk 1090, the CD-ROM 1095, or an IC card, and provided by a user. The program is read from the recording medium through I/O chip 1070 and/or the I/O controller 1084, installed and executed in the computer 500. The operation caused by the program installed and executed in the computer 500 is omitted, because it is the same as the operation in the computer 500 described with reference to FIG. 1 to 3.

The program described above can be stored in an external storage medium. Besides the flexible disk 1090 and the CD-ROM 1095, an optical storage medium such as a DVD and a PD, a magneto-optical recording medium such as a MD, a tape medium and a semiconductor memory such as a IC card can be used as the storage medium. Alternatively, a storage medium such as hard disk or RAM provided in a server system which is connected to a dedicated communication network or the Internet can be used as a recording medium, and the program can be provided to the computer 500 over the network.

Embodiments of the present invention include various functions, as, for example, the functions performed by the parts shown in the figures, which have been described above. The functions may be performed by hardware components or may be embodied in machine-executable instructions as firmware or software, which may be used to cause a general-purpose or special-purpose processor programmed with the instructions to perform the functions. Alternatively, the functions may be performed by a combination of hardware, firmware and software. The word "circuit" or "circuitry" is used in the summary, description, and/or claims. As is well known in the art, the word "circuitry" includes all levels of available integration, e.g., from discrete logic circuits to the highest level of circuit integration, and includes programmable logic components programmed to perform the functions of an embodiment as well as general-purpose or special-purpose processors programmed with instructions to perform the functions.

Although the present invention is described above by way of embodiments thereof, the technical scope of the invention is not limited by the scope described in the above embodiments. It is apparent to those skilled in the art that various changes and improvements may be made to the above embodiments. It is apparent from the claims that forms to which such changes and improvements have been made may also be embraced within the technical scope of the invention.

In the drawings and specifications there has been set forth a preferred embodiment of the invention and, although specific terms are used, the description thus given uses terminology in a generic and descriptive sense only and not for purposes of limitation.

What is claimed is:

1. An apparatus comprising:
   a receiver which receives a device distance and a device position from a position detecting device which measures the device distance from the position detecting device to each of a plurality of satellites and calculates the device position that is the position of the position detecting device based on the device distance and the position of each of the plurality of satellites;
   a verification position calculator, coupled to said receiver, which calculates a verification position that is the position to be calculated by the position detecting device, based on the received device distance and the position of each of the plurality of satellites at the time of measuring the device distance;
   a validity circuit, coupled to said verification position calculator, which judges that the device position detected by the position detecting device is valid, on condition that the device position is coincident with the verification position; and
   a distance calculator, coupled to said validity circuit, which calculates the distance between the position of each of the plurality of satellites at the time of measuring the device distance by the position detecting device and the device position received by said receiver; wherein the validity circuit judges that the device position is valid, further provided that the device distance received by said receiver differs from the distance calculated by said distance calculator by a predetermined difference value or more.

2. The apparatus according to claim 1, wherein the apparatus wirelessly communicates with the position detecting device over at least one wireless communication base station; wherein said verification position calculator calculates as another verification position the position to be calculated by the position detecting device, based on the position of the wireless communication base station over which communication with the position detecting device wirelessly occurs; and wherein said validity circuit judges that the device position detected by the position detecting device is valid, further provided that the distance between the other verification position and the device position is within a predetermined reference distance.

3. The apparatus according to claim 1, wherein said validity circuit judges that the device position is valid, further provided that a time which has elapsed since the position detecting device measures the device distance until said receiver receives the device distance and the device position is less than a predetermined reference time.

4. The apparatus according to claim 1, wherein the position detecting device measures the device distances between the position detecting device and each of at least five satellites, based on a time elapsed since each of the at least five satellites transmit a signal and until the position detecting device receives the signal; and wherein said verification position calculator calculates the verification position based on an equation, for each of the at least five satellites, whose unknowns are a clock error of the position detecting device and each element of the vector showing the coordinates of the device position, the equation showing that the distance to the satellite measured by the position detecting device, plus the clock error multiplied by the signal velocity is equal to the distance calculated based on the position of each of the at least five satellites and the device position.

5. The apparatus according to claim 1, wherein said receiver further receives from the position detecting device a device type identification information identifying the device type of the position detecting device; and wherein said verification position calculator calculates the verification position by a predetermined calculating method corresponding to the device type identification information.

6. A method comprising:
   receiving a device distance and a device position from a position detecting device which measures the device distance from the position detecting device to each of a plurality of satellites and calculates the device position that is the position of the position detecting device based on the device distance and the position of each of the plurality of satellites;
   calculating a verification position that is the position to be calculated by the position detecting device, based on the received device distance and the position of each of the plurality of satellites at the time of measuring the device distance;
   calculating a distance that is the distance between the position of each of the plurality of satellites at the time of measuring the device distance by the position detecting device and the received device position; and
   judging that the device position detected by the position detecting device is valid, on condition that the device position is coincident with the verification position and that the received distance differs from the calculated distance by a predetermined difference value or more.

7. The method of claim 6, wherein the plurality of satellites are Global Positioning System satellites.

8. The method of claim 6, further comprising:
   receiving device type information that identifies a type of the position detecting device; and
   selecting a predetermined method for calculating the verification position based at least in part upon the type of the position detecting device.

9. A product comprising:
   a computer usable medium having computer readable program code stored therein, the computer readable program code in said product being effective to:
      receive a device distance and a device position from a position detecting device which measures the device distance from the position detecting device to each of a plurality of satellites and calculates the device position that is the position of the position detecting device based on the device distance and the position of each of the plurality of satellites;
      measure the device distances between the position detecting device and each of the plurality of satellites, based on a time elapsed since each of the plurality of satellites transmits a signal and until the position detecting device receives the signal;
      calculate a verification position that is the position to be calculated by the position detecting device, based on the received device distance and the position of each of the plurality of satellites at the time of measuring the device distance, wherein the verification position is calculated based on an equation, for each of the plurality of satellites, whose unknowns are a clock error of the position detecting device and each element of the vector showing the coordinates of the device position, the equation showing that the distance to the satellite measured by the position detecting device, plus the clock error multiplied by the signal velocity, is equal to the distance calculated based on the position of each of the plurality of satellites and the device position; and
      judge that the device position detected by the position detecting device is valid, on condition that the device position is coincident with the verification position and that the received distance differs from the calculated distance by a predetermined difference value or more.

10. The product of claim 9, wherein the computer readable program code in said product being further effective to:
    receive device type information that identifies a type of the position detecting device; and
    select a predetermined method for calculating the verification position based at least in part upon the type of the position detecting device.

* * * * *

UNITED STATES PATENT AND TRADEMARK OFFICE
CERTIFICATE OF CORRECTION

PATENT NO.       : 7,609,201 B2
APPLICATION NO. : 10/908968
DATED            : October 27, 2009
INVENTOR(S)      : Kazuo Masuda It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 602 days.

Signed and Sealed this

Twelfth Day of October, 2010

David J. Kappos
*Director of the United States Patent and Trademark Office*